US008581990B2

(12) United States Patent
Fujitsuka

(10) Patent No.: US 8,581,990 B2
(45) Date of Patent: Nov. 12, 2013

(54) IMAGE PROCESSING APPARATUS, CONTROLLING METHOD THEREOF, AND RECORDING MEDIUM

(75) Inventor: Takashi Fujitsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 13/014,291

(22) Filed: Jan. 26, 2011

(65) Prior Publication Data

US 2011/0187873 A1   Aug. 4, 2011

(30) Foreign Application Priority Data

Feb. 3, 2010   (JP) ................................. 2010-022279

(51) Int. Cl.
*H04N 5/225* (2006.01)
(52) U.S. Cl.
USPC ....................................................... 348/207.1
(58) Field of Classification Search
USPC ........ 348/207.1, 207.2, 231.99, 231.2, 231.3, 348/231.7, 231.9
See application file for complete search history.

(56) References Cited

U.S. PATENT DOCUMENTS

| | | | | |
|---|---|---|---|---|
| 7,663,674 B2* | 2/2010 | Billerbeck | ................. | 348/231.6 |
| 7,742,741 B2* | 6/2010 | Borowski et al. | ............ | 455/41.2 |
| 7,956,895 B2* | 6/2011 | Kojima | ...................... | 348/207.2 |
| 8,253,808 B2* | 8/2012 | Umeyama | .................. | 348/207.2 |
| 2011/0043660 A1* | 2/2011 | Shintani | ..................... | 348/231.9 |

FOREIGN PATENT DOCUMENTS

JP   2002-191007 A   7/2002

* cited by examiner

*Primary Examiner* — Timothy J Henn
(74) *Attorney, Agent, or Firm* — Canon USA Inc. IP Division

(57) ABSTRACT

An image processing apparatus connects to a memory card with a communication function which includes a storage unit and a transmission unit configured to transmit data stored in the storage unit to an external apparatus, receives a transmission state of data stored in the memory card with the communication function from the memory card with the communication function, and discriminates a data type that the transmission unit can transmit. If the data type for determining the transmission state is a data type that the transmission unit can transmit, the image processing apparatus receives the transmission state from the memory card with the communication function and if the data type for determining the transmission state is not a data type that the transmission unit can transmit, the image processing apparatus does not receive the transmission state from the memory card with the communication function.

39 Claims, 6 Drawing Sheets

FIG.2A

| STORAGE MODE OF DATA TO BE REPRODUCED | IMAGE TO BE REPRODUCED |
|---|---|
| JPEG | JPEG |
| MOV | FRAME OF MOV DATA |
| RAW | THUMBNAIL OF RAW DATA |
| RAW + JPEG | JPEG |

FIG.2B

| CARD TYPE | TRANSMITTABLE DATA TYPE |
|---|---|
| A | JPEG MOV RAW |
| B | JPEG MOV |
| C | JPEG |

FIG.2C

|   | JPEG | MOV | RAW | RAW + JPEG |
|---|---|---|---|---|
| A | YES | YES | YES | YES |
| B | YES | YES | NO | NO |
| C | YES | NO | NO | NO |

IMAGE PROCESSING APPARATUS, CONTROLLING METHOD THEREOF, AND RECORDING MEDIUM

BACKGROUND OF THE INVENTION

1. Field of the Invention

The present invention relates to a technique for displaying and transmitting data.

2. Description of the Related Art

As discussed in Japanese Patent Application Laid-Open No. 2002-191007 for example, a memory card with a communication function is known, which is used in a digital camera and has an incorporated wireless communication unit such as wireless local area network (LAN). When the memory card with the communication function is mounted to a digital camera, image data captured by the digital camera can be wirelessly transmitted to an external apparatus without using a personal computer for example. Such a memory card with the communication function includes standard functions as memory card, and thus, when the memory card mounted to a device having a display unit such as a digital camera, data stored in the memory card can be displayed on the camera.

During use of a communication card described above, various parameters are often stored in the communication card. Examples of the parameters include information whether data currently displayed has been transmitted to a digital camera that the card is mounted to.

In this case, when the digital camera displays the various parameters on itself, the camera needs to access to the communication card every time target data is changed in order to check the parameter to display, thus a number of accesses to the communication card may increase.

SUMMARY OF THE INVENTION

According to an aspect of the present invention, there is provided an image processing apparatus including a connection unit configured to be connected to a memory card with a communication function which includes a storage unit and a transmission unit configured to transmit data stored in the storage unit to an external apparatus, a reception unit configured to receive a transmission state of data stored in the memory card with the communication function from the memory card with the communication function, a discriminant unit configured to discriminate a data type that the transmission unit can transmit, and a determination unit configured to determine the transmission state of the data stored in the memory card with the communication function, wherein the reception unit receives the transmission state from the memory card with the communication function, if the data type for determining the transmission state by the determination unit is a data type that the transmission unit can transmit, and the reception unit does not receive the transmission state from the memory card with the communication function, if the data type for determining the transmission state by the determination unit is not a data type that the transmission unit can transmit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A to 2C each illustrate an example of a table stored in the imaging apparatus according to the exemplary embodiment.

DESCRIPTION OF THE EMBODIMENTS

Various exemplary embodiments, features, and aspects of the invention will be described in detail below with reference to the drawings.

[Structure of Imaging Apparatus]

Figure 1A:
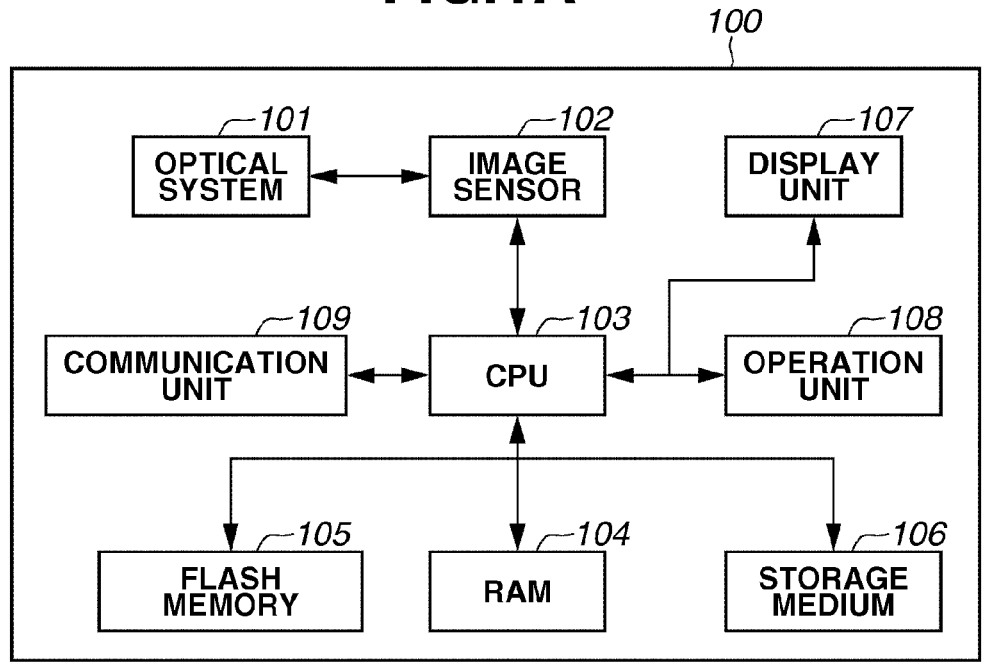
FIG. 1A is a block diagram illustrating an imaging apparatus according to an exemplary embodiment of the present invention.

FIG. 1A is a block diagram illustrating a structure of an imaging apparatus 100 as an example of an image processing apparatus according to a first exemplary embodiment of the present invention. The imaging apparatus may include a device that can capture an image of an object and obtain image data of the captured image, such as a digital camera and a digital video camera.

The imaging apparatus 100 includes an optical system 101, an image sensor 102, a central processing unit (CPU) 103, a random access memory (RAM) 104, a flash memory 105, a storage medium 106, a display unit 107, an operation unit 108, and a communication unit 109.

The optical system 101 includes lenses, a shutter, and an aperture, and forms an image of an object on the image sensor 102 with an appropriate amount of light from the object at an appropriate timing. The image sensor 102 converts the light entering through the optical system 101 to an image.

The CPU 103 performs various calculation processes, and controls each unit of the imaging apparatus 100 according to a signal input thereto and a program. More specifically, the CPU 103 controls image capturing, display, storage, and communication of the imaging apparatus 100.

The RAM 104 stores temporary data, and is used as a work area of the CPU 103. The flash memory 105 stores programs (firmware) for controlling the imaging apparatus 100 and various pieces of setting information.

The storage medium 106 stores captured image data. The storage medium 106 according to the present exemplary embodiment is a removable memory card, and can be mounted to a personal computer (PC) to read data. In other words, the imaging apparatus 100 may include a unit configured to access to the storage medium 106 to write and read data in and from the storage medium 106.

The display unit 107 displays a viewfinder image during image capturing, a captured image, and characters for interactive operations. The display unit 107 does not have to be provided in the imaging apparatus 100 as long as the imaging apparatus 100 has a function to control the display of the display unit 107.

The operation unit 108 receives an operation from a user. The operation unit 108 may include a button, a lever, and a touch panel. A user can issue an instruction to change an operation mode via the operation unit 108. The operation mode include an image capturing mode to capture an image of an object, and a reproduction mode to reproduce image data stored in the storage medium 106 onto the display unit 107. In the reproduction mode, the user can instruct the change of image data to be reproduced (reproduction target) using the operation unit 108.

The communication unit 109 is connected to an external apparatus, and transmits and receives a control command and data to and from the external apparatus. The connection is established using a protocol for data communication such as picture transfer protocol (PTP). The communication unit 109 may use a wire line connection, such as universal serial bus (USB), for the communication. Alternatively, the communication unit 109 may use a wireless connection using wireless local area network (LAN). The communication unit 109 may be directly connected to an external apparatus, or indirectly connected to an external apparatus via a server or a network such as the Internet.

The imaging apparatus 100 may be controlled by one hardware component. Alternatively, a plurality of hardware components may control the imaging apparatus 100 by sharing processes performed in the imaging apparatus 100. The imaging apparatus 100 is configured as described above.

Recording modes of the imaging apparatus 100 are described below. The recording modes in the present exemplary embodiment include a Joint Photographic Experts Group (JPEG) mode, a MOV mode, a RAW mode, and a RAW+JPEG mode. In the JPEG mode, still image data subjected to lossy compression in a JPEG format (hereinafter, referred to as JPEG data) is stored. In the MOV mode, moving image data (hereinafter, referred to as MOV data) is stored. In the RAW mode, still image data which is uncompressed or subjected to lossless compression (hereinafter, referred to as RAW data) is stored. In the RAW+JPEG mode, two types of image data, i.e. RAW data and JPEG data, are generated from one captured image data, and stored. The two types data stored in the RAW+JPEG mode are stored in association with each other as a pair.

Reproduction of image data stored in the above recording modes is described below. The reproduction of image data in the present exemplary embodiment means displaying an image based on the image data on the display unit 107.

FIG. 2A illustrates a relationship between a recording mode and a type of the target image data to be reproduced (displayed). When the image data captured in the JPEG mode is selected as the reproduction target, the JPEG data is reproduced. When the image data captured in the MOV mode is selected as the reproduction target, one frame of the MOV data such as a head frame is extracted as a still image, and is reproduced. When the image data captured in the RAW mode is selected as the reproduction target, thumbnail data contained in the RAW data is reproduced. When the image data captured in the RAW+JPEG mode is selected to be reproduced, in the pair of the image data, the JPEG data is reproduced and the RAW data cannot be selected as a target to be reproduced. This is because both of the JPEG data and the RAW data are generated from one captured image data, and a user can check the content of the image data only through the reproduction of the JPEG data. These are the relationship between the recording modes and the target images to be reproduced. However, the target image does not have to be reproduced as it is, and may be changed in a size suitable for display before reproduction.

[Structure of Communication Memory Card]

Figure 1B:
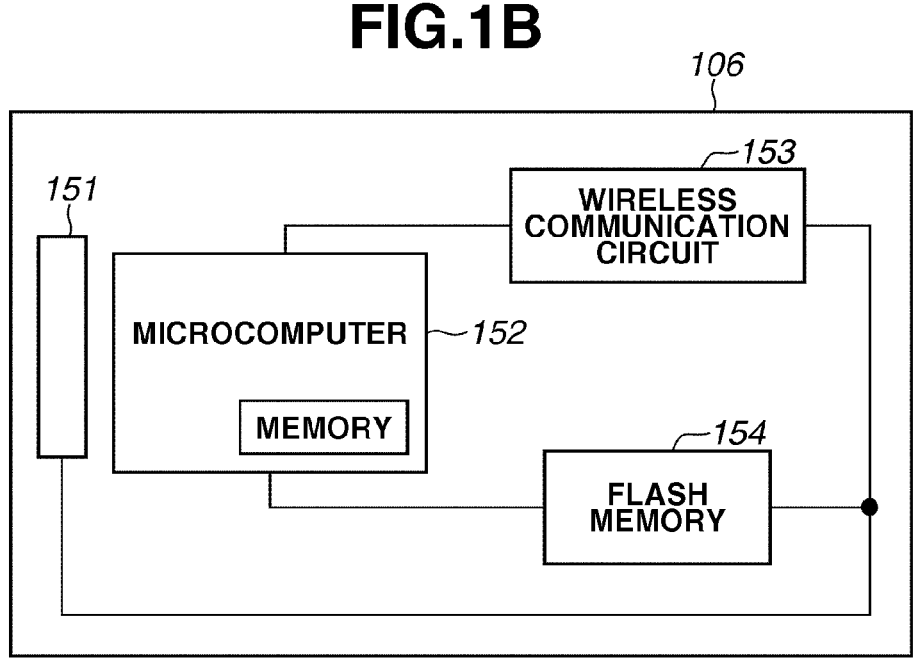
FIG. 1B is a block diagram illustrating a communication memory card according to the exemplary embodiment.

A memory card with a communication function that is used in the present exemplary embodiment is described below. In the present exemplary embodiment, the case where a memory card with a communication function (hereinafter, referred to as communication memory card) is used as a storage medium 106 is described. FIG. 1B illustrates a structure of the communication memory card. The communication memory card 106 includes a connector 151, a microcomputer 152, a wireless communication circuit 153, and a flash memory 154.

The connector 151 is an interface that connects the communication memory card 106 to the imaging apparatus 100, or to another information processing apparatus for transmission and receipt of data therebetween. The connector 151 connects the communication memory card 106 to the imaging apparatus 100 mechanically and electrically.

When connecting to the imaging apparatus 100 by the connector 151, the communication memory card 106 is supplied power from the imaging apparatus 100 via a power line. The communication memory card 106 is then initialized and starts to operate, and communicates with the imaging apparatus 100 via a bus line. The wireless communication circuit 153 has a function to transmit and receive data to and from an external apparatus other than an imaging apparatus via wireless communication. The wireless communication circuit 153 enables wireless communication using radio waves, such as wireless LAN. The infrared wireless communication may also be used.

The flash memory 154 may include a rewritable nonvolatile memory device such as a flash memory, and has a function of storing data supplied from an electric device connected thereto via the connector 151. The flash memory 154 of the present exemplary embodiment has a capacity of several gigabytes for example, and thereby can be used as a memory card that stores data in a standard way.

The microcomputer 152 has a memory incorporated therein, and controls each unit of the communication memory card 106 according to a control procedure of a program that is stored in advance in the memory. The control by the microcomputer 152 is described in more detail below.

When a predetermined type of image data is stored in the flash memory 154, the microcomputer 152 of the present exemplary embodiment controls the wireless communication circuit 153 to automatically transmit the image data to an external server for example. Through this control, when a user of the imaging apparatus 100 captures an image, the image data obtained by the image capturing is automatically transmitted to the server.

The type of image data transmitted by the communication memory card 106 depends on a type of a card to be used. FIG. 2B illustrates transmittable data types depending on card types. In the present exemplary embodiment, there are three types A, B, and C of the communication memory card 106. Type A represents a card that can transmit JPEG, MOV, and RAW data. Type B represents a card that can transmit JPEG and MOV data, but not RAW data. Type C represents a card that can transmit JPEG data, but not MOV and RAW data. The imaging apparatus 100 of the present exemplary embodiment stores an association table as illustrated in FIGS. 2A and 2B, in the flash memory 105.

[Transmitted Icon]

The imaging apparatus 100 of the present exemplary embodiment is capable of displaying an icon at reproduction of image data, the icon indicating that the image data has been already transmitted by the communication memory card 106. The display of the icon enables a user to easily recognize a communication status of image data currently displayed.

Figure 3A:
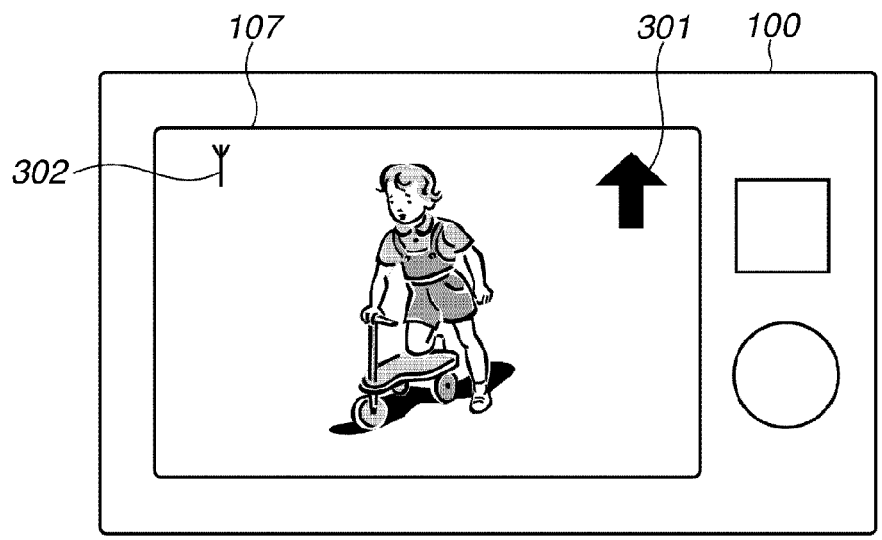
FIGS. 3A and 3B each illustrate an example of a display screen of the imaging apparatus according to the exemplary embodiment.
Figure 3B:
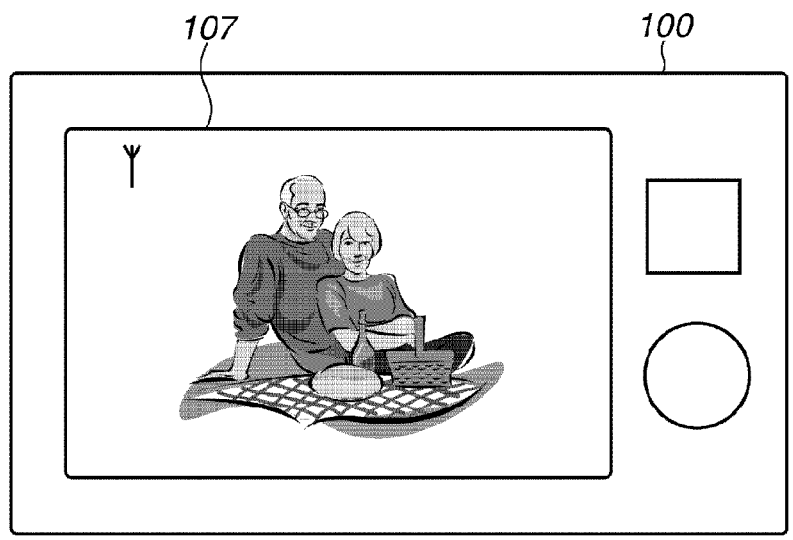

FIGS. 3A and 3B each illustrate an example of a screen displayed on the display unit 107 of the imaging apparatus 100. On the image data in FIG. 3A, an icon 301 is superimposed to indicate that the data has been already transmitted by the communication memory card 106. In contrast, on the image data in FIG. 3B, no icon 301 is displayed. This means the image data in FIG. 3B is not transmitted by the communication memory card 106 yet.

In the present exemplary embodiment, the icon is displayed if the image data has been already transmitted, and is not displayed if the image data is not transmitted yet. However, the icon may be displayed if the image data is not transmitted yet, and no icon may be displayed if the image data has been already transmitted. Alternatively, different icons may be displayed for transmitted and non-transmitted image data. In addition to the icon 301 for indicating a transmitted state, a communication icon 302 may be displayed. The communication icon 302 indicates that a function to transmit the image data by the communication memory card 106 is currently available. The communication icon 302 is displayed both in the image capturing mode and in the reproduction mode.

A process to display the icon 301 is briefly described below. The imaging apparatus 100 according to the present exemplary embodiment does not manage itself a status of each image data, that is, which image data has been already transmitted. The status whether the image data has been transmitted or not is managed by the communication memory card 106. The communication memory card 106 manages the image data that has been already transmitted using the wireless communication circuit 153 as transmitted image data, among the image data pieces stored in the flash memory 154.

The imaging apparatus 100 makes an inquiry, at reproduction of the image data, to the communication memory card 106 as to whether the reproduction target image data has been already transmitted. The communication memory card 106 responds to the inquiry about whether the reproduction target image data has been already transmitted from the imaging apparatus 100 based on information it manages. When receiving a reply, from the communication memory card 106, that the reproduction target image data has been already transmitted, the imaging apparatus 100 reproduces the image with the icon 301 superimposed on the image data. When receiving a reply, from the communication memory card 106, that the reproduction target image data has not been transmitted yet, the imaging apparatus 100 reproduces the data without superimposing the icon 301 on the image data.

The icon 301 is displayed as described above. The imaging apparatus 100 makes an inquiry to the communication memory card 106 every time the reproduction target changes, so that a user can recognize whether the image data to be reproduced has been already transmitted or not.

However, the determination whether the icon 301 is displayed requires an inquiry and a receipt of a reply to the inquiry between the imaging apparatus 100 and the communication memory card 106. Accordingly, the process of inquiry and reply increases the number of communications, and overall communication load. Further, the process requires a period of time for the communication and may delay generation and display of a reproduction screen.

Thus, the imaging apparatus 100 according to the present exemplary embodiment does not make an inquiry to the communication memory card 106 when image data of a data type that cannot be transmitted to the communication memory card 106 is reproduced. Accordingly, the number of accesses to the communication memory card 106 and overall communication load can be reduced. Further, the reproduction screen can be quickly displayed.

[Reproduction Process]

Figure 4:
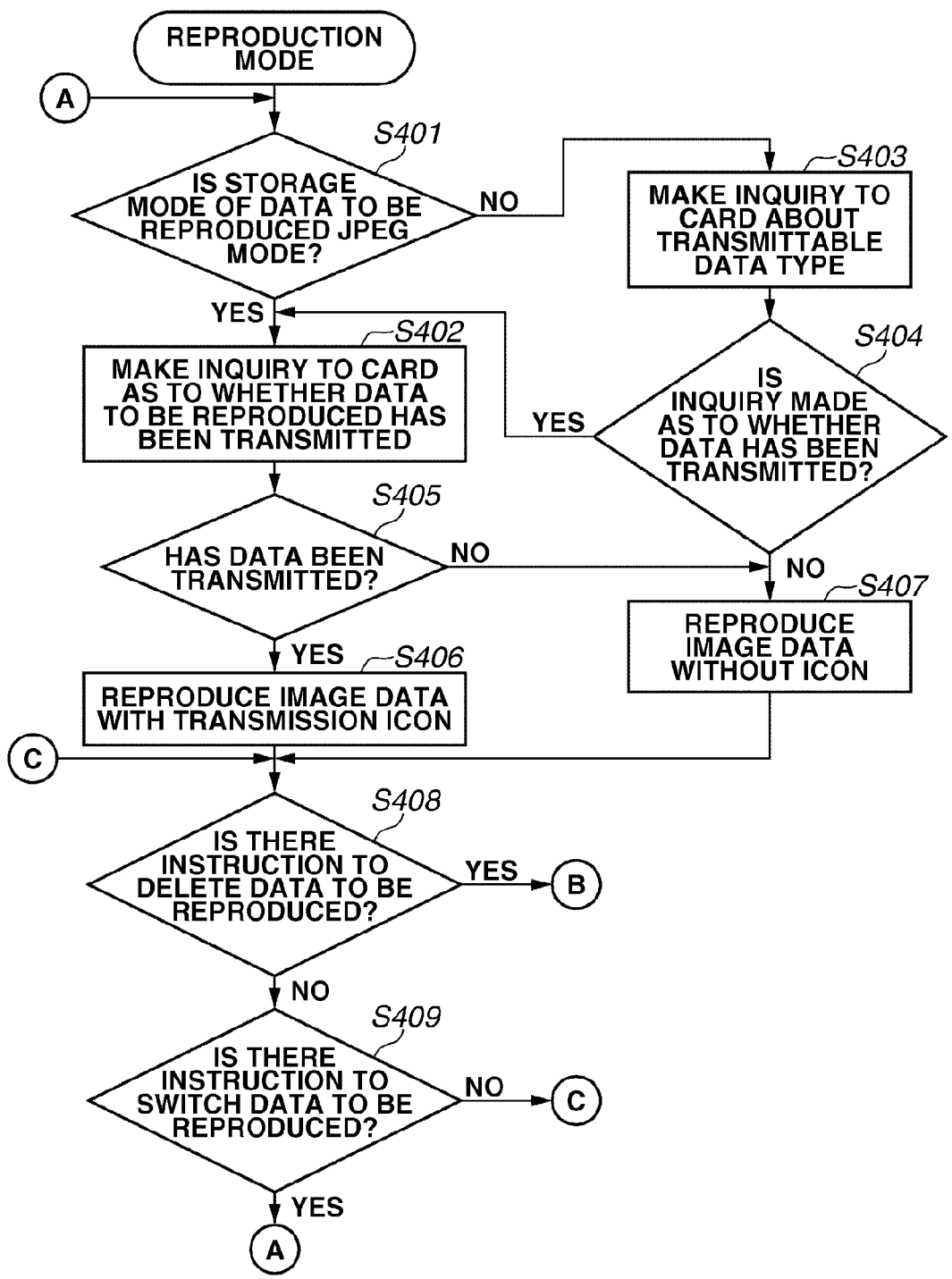
FIG. 4 is a flowchart illustrating an example of a reproduction process according to the exemplary embodiment.

FIG. 4 is a flowchart illustrating a process executed in the imaging apparatus according to the present exemplary embodiment. The process is briefly described below with reference to FIG. 4. The process illustrated in the flowchart in the present exemplary embodiment is achieved when the CPU 103 of the imaging apparatus 100 controls each unit in the imaging apparatus 100 or the communication memory card 106 based on a program or an input signal. The process in the flowchart starts when the imaging apparatus 100 enters the reproduction mode by a user's operation for example. It is assumed that the communication memory card 106 is mounted to the imaging apparatus 100 in advance.

In step S401, the CPU 103 refers to attribution information of the image data that is currently reproduced, and determines whether the recording mode is the JPEG mode or not. If the recording mode is the JPEG mode (YES in step S401), the process proceeds to step S402. If the recording mode is not the JPEG mode, but the MOV mode, the RAW mode, or the RAW+JPEG mode (NO in step S401), the process proceeds to step S403.

A case where the process proceeds to step S402 is described. In this case, the CPU 103 makes an inquiry to the communication memory card 106 as to whether the image data to be reproduced has been already transmitted. More specifically, the CPU 103 transmits a command including the inquiry and an identification (ID) such as a file name of the image data to be reproduced to the communication memory card 106. The microcomputer 152 of the communication memory card 106 refers to information indicating whether the reproduction target image data has been already transmitted that is managed by itself, and transmits a reply to the imaging apparatus 100 based on the information.

In step S405, the CPU 103 determines whether the reply from the communication memory card 106 indicates that the image data has been transmitted or not. If the CPU 103 determines that the reply indicates that the image data has been transmitted (YES in step S405), the process proceeds to step S406. If the reply indicates that the image data has not been transmitted (NO in step S405), the process proceeds to step S407.

In step S406, the CPU 103 generates an image based on the image data to be reproduced with an icon indicating the image data has been transmitted (hereinafter referred to as transmission icon), and displays the image on the display unit 107. As a result, a screen is displayed with the transmission icon 301 as illustrated in FIG. 3A. In step S407, an image based on the image data to be reproduced is displayed without adding the icon. As a result, a screen is displayed as illustrated in FIG. 3B.

Next, a case where the process proceeds from step S401 to step S403 is described. In step S403, the CPU 103 makes an inquiry to the communication memory card 106 about the card type. The communication memory card 106 makes a reply to the imaging apparatus 100 about the card type of its own. As described above, the transmittable data types are different depending on the card types (see FIG. 2B).

The reply to the inquiry may include information about a card type itself or a data type the communication memory card 106 can transmit. When received one of the card type and the data type, the imaging apparatus 100 can determine the other one using the associations illustrated in FIG. 2B. In other words, no matter which type is indicated in the received reply, the type can be used as information indicating the data type the communication memory card 106 can transmit.

In step S404, the CPU 103 determines whether to make an inquiry to the communication memory card 106 as to whether the image data to be reproduced has been transmitted, based on the data type determined in step S401 and the card type inquired in step S403.

A specific determination approach in step S404 is described below. FIG. 2C illustrates a table of the relationships between card types, recording modes, and presence/absence of inquiry to the communication memory card 106. A term "YES" in the table means a presence of inquiry to the communication memory card 106, and a term "NO" in the table means an absence of inquiry to the communication memory card 106.

When the image data recorded in the MOV mode is the reproduction target, for a card of Type A or B, the CPU 103 makes an inquiry to the communication memory card 106. For a card of Type C, the CPU 103 does not make an inquiry to the communication memory card 106. This is because the cards of Types A and B can transmit the MOV data, but the card of Type C cannot transmit the MOV data. Transmission of the MOV data will not happen with the card of Type C that cannot transmit the MOV data. Accordingly, the imaging apparatus 100 can determine that the MOV data to be reproduced has not been transmitted without inquiry to the communication memory card 106.

When the image data recorded in the RAW mode is the reproduction target, for the card of Type A, the CPU 103 makes an inquiry to the communication memory card 106. For the card of Type B or C, the CPU 103 does not make an inquiry to the communication memory card 106. This is because, as in the case with the MOV data, the card of Type A can transmit the RAW data, but the card of Types B and C cannot transmit the RAW data.

When the image data recorded in the RAW+JPEG mode is the reproduction target, for the card of Type A, the CPU 103 makes an inquiry to the communication memory card 106. For the card of Type B or C, the CPU 103 does not make an inquiry to the communication memory card 106. The reason of this is as follows. For example, the cards of Types B and C can transmit the JPEG data. If, however, the transmission icon is displayed when only JPEG data is transmitted, a user may get a wrong idea that both JPEG data and RAW data have been transmitted. Thus, in the present exemplary embodiment, the transmission icon is set to be displayed when both JPEG data and RAW data are transmitted. Accordingly, for the card of Type B or C that cannot transmit the RAW data, the imaging apparatus 100 determines that the reproduction target image data is not transmitted without inquiry to the communication memory card 106.

When the image data recorded in the JPEG mode is the reproduction target, regardless of the card type (without inquiry about the card type in the present exemplary embodiment), the CPU 103 makes an inquiry to the communication memory card 106. This is because a card of any type can transmit the JPEG data. This process corresponds to a process when it is determined YES in step S401.

The specific determination process in step S404 is performed as described above. When the imaging apparatus 100 determines not to make an inquiry in step S404 (NO in step S404), the imaging apparatus 100 advances the process to step S407, and displays the image data without adding the transmission icon. When the imaging apparatus 100 determines to make an inquiry in step S404 (YES in step S404), the imaging apparatus 100 advances the process to step S402. In steps S402 to S408, the imaging apparatus 100 displays image data corresponding to the reply to the inquiry to the communication memory card 106.

A case where the image data to be reproduced is recorded in the RAW+JPEG mode in the card of Type A is described. In this case, in step S402, the CPU 103 makes an inquiry as to whether both RAW data and JPEG data have been transmitted. In step S405, the CPU 103 determines YES if both data have been transmitted, and, the CPU 103 determines NO if at least one of the data has not been transmitted yet.

In step S408, the CPU 103 determines whether there is an instruction from a user to delete the reproduction target image data. When the CPU 103 determines that the instruction is input (YES in step S408), the process proceeds to step S501 in FIG. 5. When the CPU 103 determines that the instruction is not input (NO in step S408), the process proceeds to step S409.

In step S409, the CPU 103 determines whether there is an instruction from a user to switch the reproduction target image data. When the CPU 103 determines that the instruction is input (YES in step S409), the process returns to step S401. The CPU 103 determines whether to display a transmission icon on new image data to be reproduced. When the CPU 103 determines that the instruction is not input (NO in step S408), the process returns to step S408.

[Deletion Process]

Figure 5:
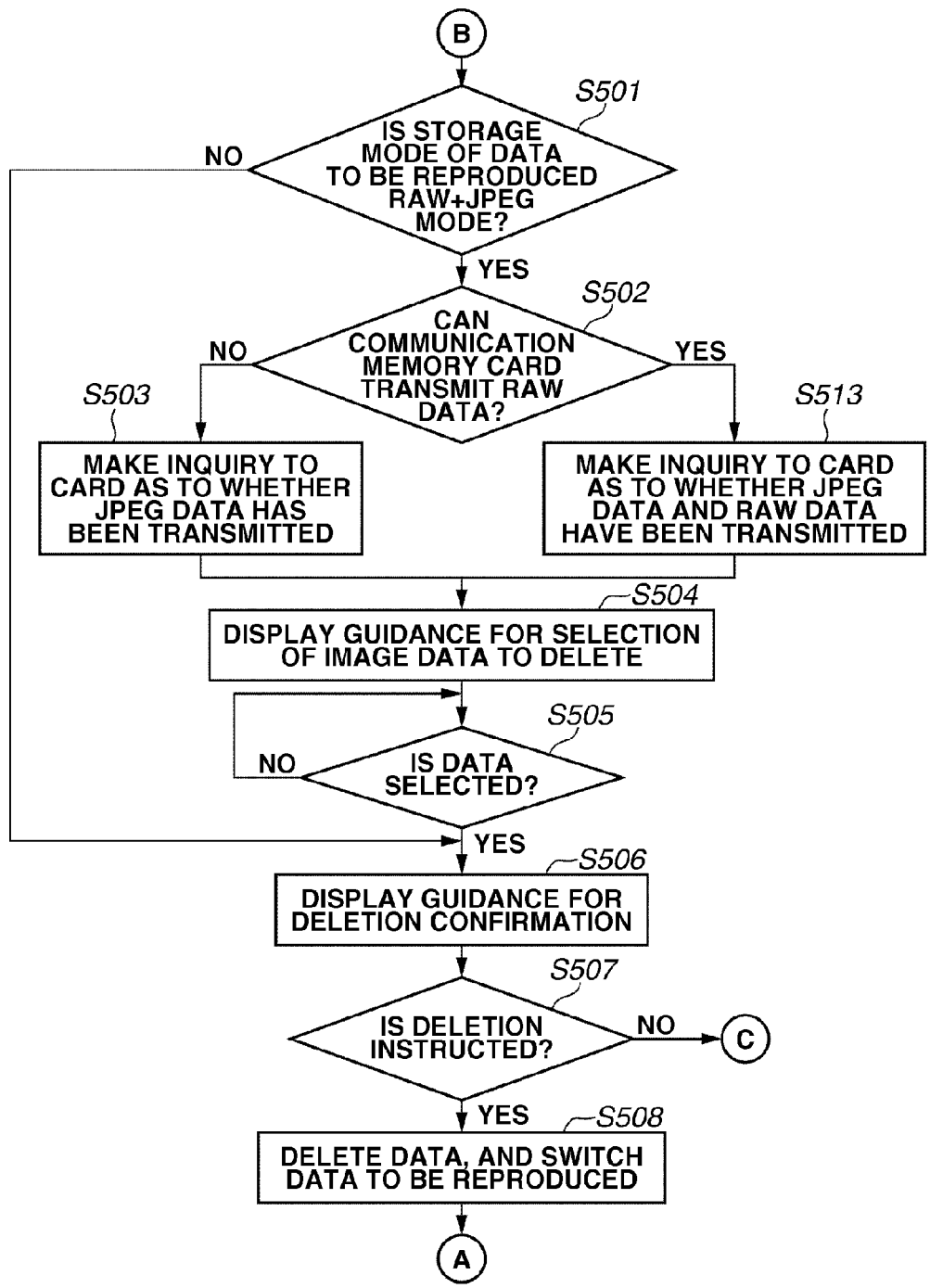
FIG. 5 is a flowchart illustrating an example of a deletion process according to the exemplary embodiment.

A case where the CPU 103 determines that the instruction is input by the user in step S408 to delete the reproduction target image data is described. FIG. 5 is a flowchart illustrating a process of deleting image data according to the present exemplary embodiment.

In step S501, the CPU 103 determines whether the recording mode of the image data to be reproduced, namely the image data to be deleted, is the RAW+JPEG mode. When the CPU 103 determines that the recording mode is the RAW+JPEG mode (YES in step S501), the process proceeds to step S502. When the CPU 103 determines that the recording mode is not the RAW+JPEG mode (NO in step S501), the process proceeds to step S506.

In step S502, the CPU 103 determines whether the communication memory card 106 can transmit the RAW data. In terms of the card type, the card of Type A can transmit the RAW data. The imaging apparatus 100 makes a determination using the information obtained in step S403 in FIG. 4. When the CPU 103 determines that the communication memory card 106 can transmit the RAW data (YES in step S502), the process proceeds to step S513. When the CPU 103 determines that the communication memory card 106 cannot transmit the RAW data (NO in step S502), the process proceeds to step S503.

In step S503, the CPU 103 makes an inquiry to the communication memory card 106 as to whether the JPEG data has been already transmitted among the RAW+JPEG data to be deleted. The inquiry is made as in the process in FIG. 4. The communication memory card 106 transmits a reply about whether the JPEG data has been transmitted to the imaging apparatus 100 or not. The imaging apparatus 100 receives the reply. In the S503, no inquiry is made about whether the RAW data has been transmitted or not. The communication memory card 106 is already determined to be incapable of transmitting the RAW data in step S502, and thus the RAW data is regarded as not transmitted without making an inquiry about the transmission in step S503.

In step S513, the CPU 103 makes an inquiry to the communication memory card 106 as to whether both RAW and JPEG data of the image data to be deleted have been transmitted. More specifically, a first inquiry is made as to whether the JPEG data has been transmitted. After receiving a reply to the first inquiry, the CPU 103 makes a second inquiry as to whether the RAW data has been transmitted, and receives a reply to the second inquiry. The two inquires are made in this case.

Figure 6A:
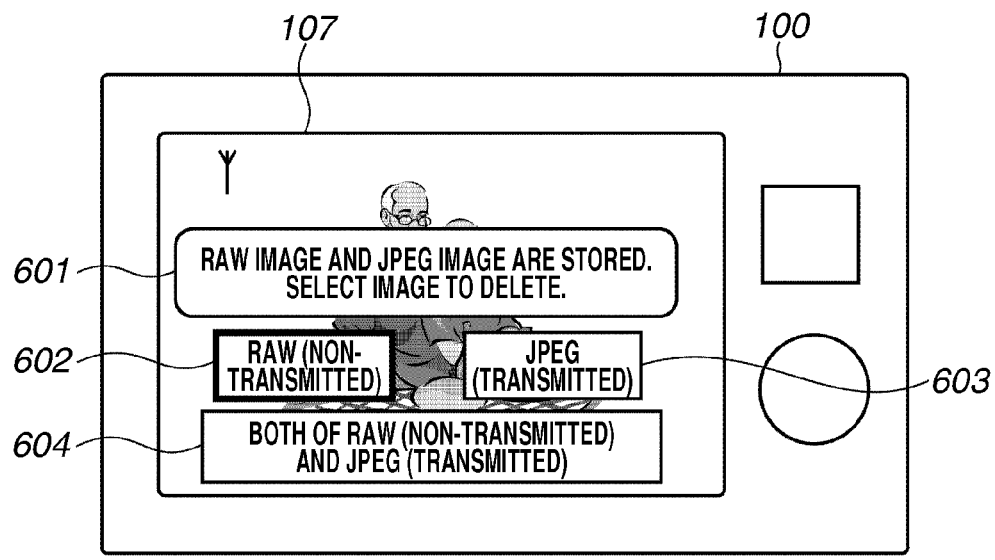
FIGS. 6A and 6B each illustrate an example of a display screen of the imaging apparatus according to the exemplary embodiment.

In step S504, the CPU 103 displays a selection guidance that makes a user select the image data to be deleted from the RAW data and the JPEG data that are associated with each other. FIG. 6A illustrates an example of the selection guidance. A dialog 601 indicates that the image data to delete is recorded in the RAW+JPEG mode, and prompts the user to select the data to be deleted. When the user selects a dialog 602 on the screen, only the RAW data is selected as the data to be deleted. When the user selects a dialog 603, only the JPEG data is selected as the data to be deleted. When the user selects a dialog 604, both the RAW data and the JPEG data are selected as the data to be deleted.

These dialogs 602 to 604 each include information indicating whether the JPEG data and/or the RAW data have been transmitted or not. The information is based on the replies to the inquiries in steps S503 and S513. The information display allows the user to easily select the image data to delete.

In step S505, the CPU 103 determines which dialog out of the dialogs 602 to 604 is selected. When the CPU 103 determines that one of the dialogs is selected (YES in step S505), the process proceeds to step S506.

Figure 6B:
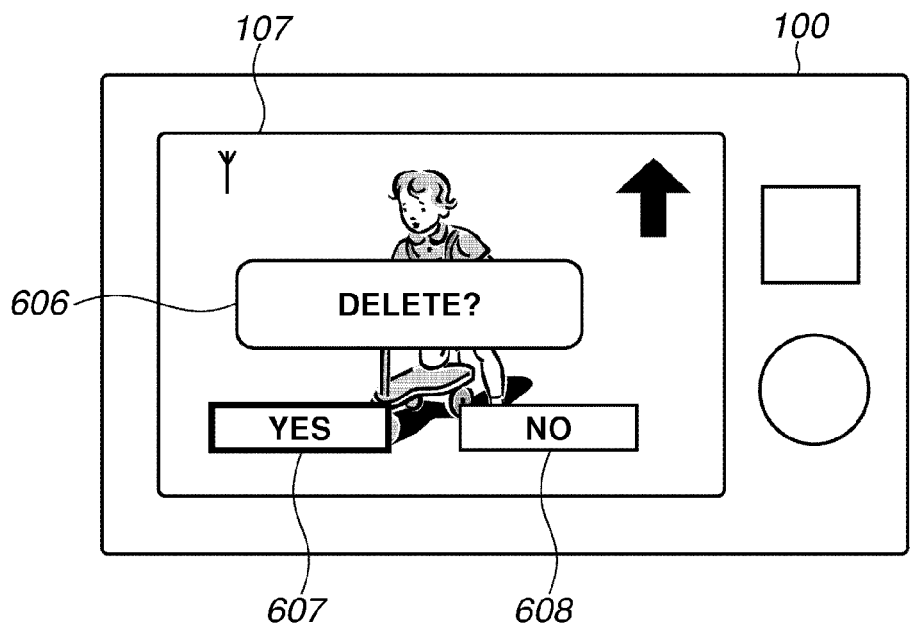

In step S506, the CPU 103 displays a confirmation screen to confirm deletion of the selected image data to a user. FIG. 6B illustrates an example of the confirmation screen. The confirmation screen displays dialogs 606 to 608 which prompt the user to make a final check of the deletion.

In step S507, the CPU 103 determines whether the deletion is instructed, in other words, the dialog 607 is selected. When the CPU 103 determines that the dialog 607 is selected (YES in step S507), the process proceeds to step S508. When the CPU 103 determines that the dialog 607 is not selected (NO in step S507), in other words, the dialog 608 is selected, the process returns to step S408 in FIG. 4.

In step S508, the CPU 103 accesses the communication memory card 106, and deletes the image data selected to delete. The CPU 103 then switches to subsequent image data as a target to be reproduced. The process returns to step S401.

The deletion process according to the present exemplary embodiment is generally performed as described above. The process enables a user to easily delete the data in which two image data pieces are recorded in the RAW+JPEG mode in association with each other.

The imaging apparatus 100 according to the present exemplary embodiment can set the wireless communication function of the communication memory card 106 invalid. When the wireless communication function is set invalid, notification about the invalid state may be displayed on the display unit 107 for several seconds after the imaging apparatus 100 is activated. When the wireless communication function is set invalid, no communication icon 302 is displayed.

In the above described first exemplary embodiment, an inquiry about the card type of the communication memory card 106 is made as in step S403 at every time the target data to be reproduced is changed. In contrast, as another exemplary embodiment, an inquiry about the card type may be made at a start-up or shift to reproduction mode of the imaging apparatus imaging apparatus 100, and the information may be stored in the flash memory 105. According to this case, only one inquiry is necessary at the beginning of the start-up or shift, the number of communications with the communication memory card 106 and overall communication load can be reduced.

Further in the present exemplary embodiment, in addition to the icons indicating that the image data to be reproduced has been already transmitted or not, various statuses of the image data may be displayed. For example, the communication memory card 106 may manage information indicating that the image data is being transmitted, or information indicating that the image data could not be transmitted due to a failure in communication with an external apparatus. In this case, an icon indicating that the image data is being transmitted, and an icon indicating failed transmission may be displayed instead of the transmission icon 301.

Further, the communication memory card 106 can be set to transmit image data to a plurality of external apparatuses, and manage the status of image data which is transmitted or not yet transmitted for each destination external apparatus. In this case, a plurality of the transmission icons 301 is displayed for every destination external apparatus. In addition, the communication memory card 106 may manage attributions of image data such as write protect and transmission protect, where the present invention may be applied. In this case, icons for the attributions can be displayed in combination with the transmission icon 301.

The above described exemplary embodiments are merely examples of the present invention, and can be appropriately combined with each other. Further, an imaging apparatus is described in the above described exemplary embodiments, however the present invention is applicable to an image viewer and a cell phone.

Furthermore, image data is described as an example in the above described exemplary embodiments, however the present invention is applicable to content data such as music data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-022279 filed Feb. 3, 2010, which is hereby incorporated by reference herein in its entirety.

What is claimed is:

1. An image processing apparatus comprising:
    a connection unit configured to be connected to a memory card with a communication function which includes a storage unit and a transmission unit configured to transmit data stored in the storage unit to an external apparatus;
    a reception unit configured to receive a transmission state of data stored in the memory card with the communication function from the memory card with the communication function;
    a discriminant unit configured to discriminate a data type that the transmission unit can transmit; and
    a determination unit configured to determine the transmission state of the data stored in the memory card with the communication function,
    wherein the reception unit receives the transmission state from the memory card with the communication function, if the data type for determining the transmission state by the determination unit is a data type that the transmission unit can transmit, and
    the reception unit does not receive the transmission state from the memory card with the communication function, if the data type for determining the transmission state by the determination unit is not a data type that the transmission unit can transmit.

2. The image processing apparatus according to claim 1, wherein the transmission state indicates whether the data stored in the memory card with the communication function has been already transmitted to the external apparatus by the transmission unit.

3. The image processing apparatus according to claim 2, wherein the determination unit determines that the data is not transmitted to the external apparatus without receiving the transmission state at the reception unit, if the data type for determining the transmission state by the determination unit is not a data type that the transmission unit can transmit.

4. The image processing apparatus according to claim 1, further comprising:
   a display control unit configured to control a display of the data stored in the memory card with the communication function,
   wherein the reception unit receives the transmission state of the data as a target to be displayed by the display control unit.

5. The image processing apparatus according to claim 4, wherein the display control unit controls display such that the transmission state received from the reception unit can be recognized by a user if the data stored in the memory card with the communication function is displayed on a screen.

6. The image processing apparatus according to claim 1, wherein the data type that the transmission unit can transmit includes image data recorded in a JPEG format.

7. A method for controlling an image processing apparatus, the method comprising:
   connecting the image processing apparatus to a memory card with a communication function which includes a storage unit and a transmission unit configured to transmit data stored in the storage unit to an external apparatus;
   receiving a transmission state of data stored in the memory card with the communication function from the memory card with the communication function;
   discriminating a data type that the transmission unit can transmit; and
   determining the transmission state of the data stored in the memory card with communication function,
   wherein the transmission state is received from the memory card with the communication function, if the data type for determining the transmission state is a data type that the transmission unit can transmit, and
   the transmission state is not received from the memory card with the communication function, if the data type for determining the transmission state is not a data type that the transmission unit can transmit.

8. A non-transitory computer-readable recording medium recording a program for causing a computer to function as an image processing apparatus of claim 1.

9. The image processing apparatus according to claim 1, further comprising: an inquiry unit configured to make an inquiry on the transmission state of data stored in the memory card with the communication function to the memory card with the communication function, wherein the reception unit receives the transmission state transmitted from the memory card with the communication function based on the inquiry made by the inquiry unit.

10. The image processing apparatus according to claim 1, wherein the discriminant unit discriminates, in a state of being connected to the memory card with the communication function, the data type that the transmission unit can transmit.

11. An image processing apparatus comprising:
   a connection unit configured to be connected to a memory card with a communication function which includes a storage unit and a transmission unit configured to transmit data stored in the storage unit to an external apparatus;
   an inquiry unit configured to make an inquiry on a transmission state of data stored in the memory card with the communication function to the memory card with the communication function;
   a discriminant unit configured to discriminate, in a state of being connected to the memory card with the communication function by the connection unit, a data type that the transmission unit can transmit; and
   a determination unit configured to determine the transmission state of the data stored in the memory card with the communication function,
   wherein the inquiry unit makes the inquiry on the transmission state to the memory card with the communication function, if a data type for determining the transmission state by the determination unit is the data type that the transmission unit can transmit, and
   the inquiry unit does not make the inquiry on the transmission state to the memory card with the communication function, if a data type for determining the transmission state by the determination unit is not the data type that the transmission unit can transmit.

12. The image processing apparatus according to claim 11, wherein the transmission state indicates whether the data stored in the memory card with the communication function has been already transmitted to the external apparatus by the transmission unit.

13. The image processing apparatus according to claim 12, wherein the determination unit determines that the data is not transmitted to the external apparatus without the inquiry on the transmission state being made by the inquiry unit, if the data type for determining the transmission state by the determination unit is not the data type that the transmission unit can transmit.

14. The image processing apparatus according to claim 11, wherein the transmission state indicates whether the data stored in the memory card with the communication function is being transmitted to the external apparatus by the transmission unit.

15. The image processing apparatus according to claim 11, wherein the transmission state indicates whether the data stored in the memory card with the communication function has not been transmitted to the external apparatus as a consequence of an attempt by the transmission unit to transmit the data stored in the memory card with the communication function to the external apparatus.

16. The image processing apparatus according to claim 11, further comprising:
   a display control unit configured to control a display of the data stored in the memory card with the communication function,
   wherein the inquiry unit makes the inquiry on the transmission state of data of which the display is to be controlled by the display control unit.

17. The image processing apparatus according to claim 16, wherein the display control unit controls display such that the transmission state of the data of which the display is to be controlled by the display control unit can be recognized by a user if the data stored in the memory card with the communication function is displayed on a screen.

18. The image processing apparatus according to claim 11, further comprising:
   an imaging unit configured to generate image data by capturing an image of an object; and a storage control unit configured to cause the storage unit of the memory card with the communication function to store, as the data, the image data generated by the imaging unit.

19. The image processing apparatus according to claim 18, further comprising a selecting unit configured to select an operation mode from a plurality of modes including an image capturing mode to generate the image data by the imaging unit and a reproduction mode to control the display of the image data stored in the storage unit of the memory card with the communication function by the display control unit.

20. The image processing apparatus according to claim 19, wherein the discriminant unit, upon start of the reproduction mode, discriminates the data type that the transmission unit can transmit.

21. The image processing apparatus according to claim 11, further comprising a receiving unit configured to receive a type of the memory card with the communication function from the memory card with the communication function,
wherein the discriminant unit discriminates the data type that the transmission unit can transmit based on the type of the memory card with the communication function.

22. The image processing apparatus according to claim 11, wherein the data type that the transmission unit can transmit includes image data recorded in a JPEG format.

23. The image processing apparatus according to claim 11, wherein the transmission unit of the memory card transmits the data via wireless communication.

24. An image processing apparatus comprising:
a connection unit configured to be connected to a memory card with a communication function which includes a storage unit and a transmission unit configured to transmit data stored in the storage unit to an external apparatus;
an inquiry unit configured to make an inquiry on a transmission state of data stored in the memory card with the communication function to the memory card with the communication function,
a discriminant unit configured to discriminate, in a state of being connected to the memory card with the communication function by the connection unit, a data type that the transmission unit can transmit; and
a determination unit configured to determine the transmission state of the data stored in the memory card with the communication function based on a result of the inquiry by the inquiry unit,
wherein the inquiry unit does not make the inquiry on the transmission state of the data of which the data type is discriminated as a data type that the transmission unit cannot transmit, to the memory card with the communication function.

25. The image processing apparatus according to claim 24, wherein the transmission state indicates whether the data stored in the memory card with the communication function has been already transmitted to the external apparatus by the transmission unit.

26. The image processing apparatus according to claim 24, wherein the transmission state indicates whether the data stored in the memory card with the communication function is being transmitted to the external apparatus by the transmission unit.

27. The image processing apparatus according to claim 24, further comprising:
a display control unit configured to control a display of the data stored in the memory card with the communication function,
wherein the inquiry unit makes the inquiry on the transmission state of data of which the display is to be controlled by the display control unit.

28. The image processing apparatus according to claim 27, wherein the display control unit controls display such that the transmission state of the data of which the display is to be controlled by the display control unit can be recognized by a user if the data stored in the memory card with the communication function is displayed on a screen.

29. The image processing apparatus according to claim 27, wherein the determination unit determines that the data is not transmitted to the external apparatus without the inquiry on the transmission state being made by the inquiry unit, if the data type of the data of which the display is to be controlled by the display control unit is not a type that the transmission unit can transmit.

30. The image processing apparatus according to claim 24, further comprising:
an imaging unit configured to generate image data by capturing an image of an object; and
a storage control unit configured to cause the storage unit of the memory card with the communication function to store, as the data, the image data generated by the imaging unit.

31. The image processing apparatus according to claim 30, further comprising a selecting unit configured to select an operation mode from a plurality of modes including an image capturing mode to generate the image data by the imaging unit and a reproduction mode to control the display of the image data stored in the storage unit of the memory card with the communication function by the display control unit.

32. The image processing apparatus according to claim 31, wherein the discriminant unit, upon start of the reproduction mode, discriminates the data type that the transmission unit can transmit.

33. The image processing apparatus according to claim 24, further comprising a receiving unit configured to receive a type of the memory card with the communication function from the memory card with the communication function,
wherein the discriminant unit discriminates the data type that the transmission unit can transmit based on the type of the memory card with the communication function.

34. The image processing apparatus according to claim 24, wherein the data type that the transmission unit can transmit includes image data recorded in a JPEG format.

35. The image processing apparatus according to claim 24, wherein the transmission unit of the memory card transmits the data via wireless communication.

36. A method for controlling an image processing apparatus, the method comprising:
connecting the image processing apparatus to a memory card with a communication function which includes a storage unit and a transmission unit configured to transmit data stored in the storage unit to an external apparatus;
inquiring a transmission state of data stored in the memory card with the communication function from the memory card with the communication function;
discriminating, in a state that the apparatus is connected to the memory card with the communication function, a data type that the transmission unit can transmit; and
determining the transmission state of the data stored in the memory card with communication function,
wherein the inquiring is performed, if the data type for determining the transmission state is a data type that the transmission unit can transmit, and the inquiry is not performed, if the data type for determining the transmission state is not a data type that the transmission unit can transmit.

37. A method for controlling an image processing apparatus, the method comprising:
  connecting the image processing apparatus to a memory card with a communication function which includes a storage unit and a transmission unit configured to transmit data stored in the storage unit to an external apparatus;
  inquiring a transmission state of data stored in the memory card with the communication function from the memory card with the communication function;
  discriminating a data type that the transmission unit can transmit; and
  determining, in a state that the apparatus is connected to the memory card with the communication function, the transmission state of the data stored in the memory card with communication function based on a result of the inquiry made in the inquiring,
  wherein the inquiring does not inquire the transmission state of the data of which the data type is discriminated as a data type that the transmission unit cannot transmit, to the memory card with the communication function.

38. A non-transitory computer-readable recording medium recording a program for causing a computer to function as an image processing apparatus of claim 11.

39. A non-transitory computer-readable recording medium recording a program for causing a computer to function as an image processing apparatus of claim 24.

* * * * *